(12) United States Patent
Stafstrom et al.

(10) Patent No.: US 11,517,833 B2
(45) Date of Patent: Dec. 6, 2022

(54) AIR TRAPPING DEVICE AND NOZZLE THEREFORE

(71) Applicant: GE Healthcare Bio-Sciences AB, Uppsala (SE)

(72) Inventors: Nils Stafstrom, Uppsala (SE); Bjorn Johansson, Uppsala (SE); Andreas Marcstrom, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 218 days.

(21) Appl. No.: 16/641,579

(22) PCT Filed: Aug. 31, 2018

(86) PCT No.: PCT/EP2018/073526
§ 371 (c)(1),
(2) Date: Feb. 24, 2020

(87) PCT Pub. No.: WO2019/043188
PCT Pub. Date: Mar. 7, 2019

(65) Prior Publication Data
US 2021/0039020 A1    Feb. 11, 2021

(30) Foreign Application Priority Data
Aug. 31, 2017 (GB) ................................ 1713993

(51) Int. Cl.
*B01D 19/00* (2006.01)
*B01D 19/02* (2006.01)
(Continued)

(52) U.S. Cl.
CPC ......... *B01D 19/0047* (2013.01); *B01D 19/02* (2013.01); *B05B 1/06* (2013.01); *B05B 1/08* (2013.01)

(58) Field of Classification Search
None
See application file for complete search history.

(56) References Cited

U.S. PATENT DOCUMENTS 4,368,118 A    1/1983  Siposs
4,755,194 A *  7/1988  Rooker ............. B01D 19/0047
                                             96/206
(Continued)

FOREIGN PATENT DOCUMENTS

GB    2212739 A    8/1989
GB    2362337 A    11/2001
(Continued)

OTHER PUBLICATIONS

PCT International Search Report and Written Opinion for PCT Application No. PCT/EP2018/073526 dated Oct. 24, 2018 (9 pages).
(Continued)

*Primary Examiner* — Jason M Greene
(74) *Attorney, Agent, or Firm* — Eversheds Sutherland (US) LLP

(57) ABSTRACT

The present invention relates to a nozzle for an air trapping device configured to remove air from a fluid, the nozzle comprising a body having an input opening configured to receive the fluid and an output opening configured to distribute the fluid along an edge of the output opening, wherein the edge comprises a control element configured to reduce surface tension of the fluid. The present invention further relates to an air trapping device 200 configured to remove air from a fluid and comprising the nozzle.

6 Claims, 11 Drawing Sheets

(51) Int. Cl.
*B05B 1/06* (2006.01)
*B05B 1/08* (2006.01)

(56) References Cited

U.S. PATENT DOCUMENTS

| | | | |
|---|---|---|---|
| 4,853,006 A * | 8/1989 | Mangnall | B01D 19/0047 |
| | | | 96/197 |
| 2001/0042441 A1 | 11/2001 | Purdom et al. | |
| 2007/0068597 A1* | 3/2007 | Dorsch | B01D 19/02 |
| | | | 141/286 |
| 2008/0134766 A1 | 6/2008 | Andersson | |
| 2010/0264275 A1 | 10/2010 | Behruzi et al. | |

FOREIGN PATENT DOCUMENTS

| | | |
|---|---|---|
| JP | H0534032 A | 2/1993 |
| JP | 2000126507 A | 5/2000 |
| JP | 2006234430 A | 9/2006 |

OTHER PUBLICATIONS

Great Britain Search Report for GB Application No. 1713993.2 dated Feb. 28, 2018 (3 pages).
Japanese Office Action for JP Application No. 2020-512491 dated Aug. 8, 2022 (8 pages).

* cited by examiner

AIR TRAPPING DEVICE AND NOZZLE THEREFORE

CROSS REFERENCE TO RELATED APPLICATIONS

This application claims the priority benefit of PCT/EP2018/073526 filed on Aug. 31, 2018, which claims priority benefit of Great Britain Patent Application No. 1713993.2 filed on Aug. 31, 2017, the entire contents of which are hereby incorporated by reference herein.

TECHNICAL FIELD

The present invention relates to an air trapping device and nozzle therefore configured to remove air from a fluid. In particular, to remove air from a fluid provided to a chromatography apparatus.

BACKGROUND

Chromatography is a well-known procedure for analyzing and preparing chemical mixtures or chemical samples. The sample may typically be dissolved in a fluid, referred to as a buffer composition. The various sample components of the mixture may travel through a column at different speeds, causing them to separate. This separation may be used to separate the sample components in a fractionation step where the mobile phase may be directed to different containers, e.g. by an outlet valve of the chromatography apparatus.

The fractionation step may be controlled based on a sensor detecting various properties of the fluid exiting the column, e.g. detected ultraviolet light absorption properties of the fluid.

One problem with such chromatography systems is that air present in the fluid travelling through the column will interfere with the separation and detection of the properties of the fluid.

Some existing chromatography systems may address this by including an air trapping device e.g. having a sealed and elongated receptacle provided with an inlet and outlet arranged at the bottom part of the receptacle, the bottom being defined as an end portion oriented in the direction of gravity.

At least one problem with such conventional air trapping device is that portions of the fluid entering the air trapping device through the inlet will immediately exit the air trapping device through the outlet. Similarly, together with the portions of the fluid air trapped therein may also immediately exit the air trapping device through the outlet.

A further problem arises when the fluid provided to the chromatography apparatus changes as a gradient over time, e.g. from a fluid having low density to a fluid having a high density. Ideally the gradient should typically display a linear or desired characteristic. When portions of the fluid entering the air trapping device through the inlet immediately exit the air trapping device through the outlet, the linearity of the gradient will be degraded.

At least one problem with such conventional air trapping devices is the generation of foam within the air trapping device.

Thus, there is a need for an improved air trapping device and nozzle therefore.

OBJECTS OF THE INVENTION

An objective of embodiments of the present invention is to provide a solution which mitigates or solves the drawbacks and problems described above.

SUMMARY OF THE INVENTION

The above and further objectives are achieved by the subject matter described herein. Further advantageous implementation forms of the invention are further defined herein According to a first aspect of the invention, the above mentioned and other objectives are achieved with a nozzle for an air trapping device configured to remove air from a fluid, the nozzle comprising a body having an input opening configured to receive the fluid and an output opening configured to distribute the fluid along an edge of the output opening, wherein the edge comprises a control element configured to reduce surface tension of the fluid.

At least an advantage of the invention according to this embodiment is that a gradient of the fluid is maintained. A further advantage is that foaming is reduced.

According to a second aspect of the invention, the above mentioned and other objectives are achieved with an air trapping device configured to remove air from a fluid and comprising the nozzle according to the first aspect.

The advantages of the second aspect are the same as for the first aspect.

Further applications and advantages of embodiments of the invention will be apparent from the following detailed description.

BRIEF DESCRIPTION OF THE DRAWINGS

FIG. 6A-B shows an air trapping device according to one or more embodiments of the present disclosure.

Figure 1:
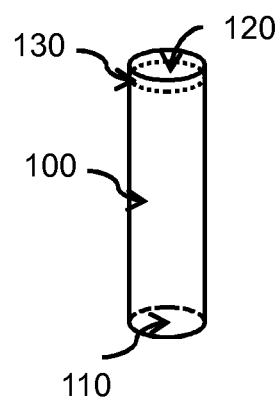
FIG. 1 shows a nozzle for an air trapping device having a trailing edge with a control element according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

In the present disclosure reference will be made interchangeably to receptacle, container or reservoir, signifying an arrangement suitable for holding fluid.

In the present disclosure reference will be made interchangeably to fluid inlet and inlet. In the present disclosure reference will be made interchangeably to fluid outlet and outlet.

FIG. 1 shows a nozzle 100 for an air trapping device configured to remove air from a fluid. The nozzle 100 is typically configured to be coupled to an inlet 250 of the air trapping device, e.g. by enclosing or being enclosed by the inlet 250. The nozzle may further be provided with a seal arranged between the inlet and the nozzle, as further described in relation to FIG. 10.

The nozzle 100 may comprise a body having an input opening 110 configured to receive the fluid and an output opening 120 configured to distribute the fluid along a trailing edge of the output opening 120. In one example, the nozzle 100 is coupled to the inlet 250 of the air trapping device 200 and receives fluid from the inlet 250. The fluid is then directed within a fluid channel within the body to the output opening 120. The nozzle is typically configured to be oriented with the body having input opening 110 in the direction of gravity and the output opening 120 in a direction opposite to the direction of gravity. I.e. the body is configured to be vertically aligned with the direction of gravity. This has the effect that received fluid is distributed evenly along the edge of the output opening 120. In one example, the body is shaped as a tubular or cylindrical element.

When fluid is distributed along the edge, one or more droplets will be formed that will grow in size until the force of gravity overcomes the surface tension. This may result in a pulsating flow of fluid over the edge.

To overcome this problem, the present disclosure provides an edge that comprises a control element 130 configured to reduce surface tension of the fluid. This feature has the effect to create an even flow of fluid along the edge by reducing the surface tension.

At least one advantage of the present disclosure is that the generation of foam is mitigated or reduced by ensuring gentle introduction of the fluid, received from the inlet 250, into the receptacle 210. Yet an advantage of the present disclosure is that foaming is further reduced by mitigating or reducing pulsation or variation in the fluid flow by introducing a control element 130. This is achieved by introducing an edge comprising the control element 130 that will break up the surface tension and thereby mitigate or reduce the formation of droplets causing pulsation or variation of the fluid flow. The reduced pulsation or variation of the fluid flow further mitigates or reduces the formation or foam or foaming.

At high rates of fluid flow, a cylindrically formed nozzle may not be able to sustain the desired even flow of fluid along the edge and may even eject fluid in an upward direction opposite to the direction of gravity.

Figure 2:
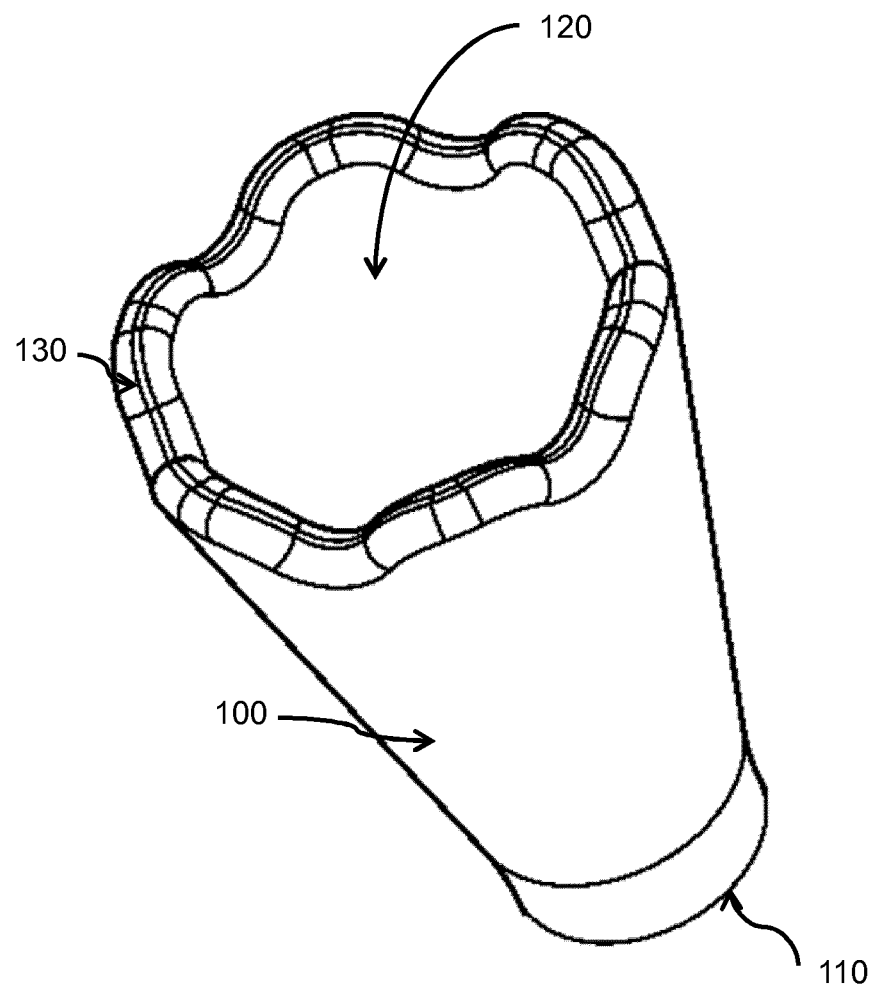
FIG. 2 shows a nozzle for an air trapping device having a body with a funnel shape according to one or more embodiments of the present disclosure.

FIG. 2 shows a nozzle 100 for an air trapping device 200 having a body with a funnel shape according to one or more embodiments of the present disclosure. A nozzle 100 is provided wherein the body has a funnel shape and an input opening 110 being smaller than the output opening 120. This has at least the effect of increasing the circumference of the edge and reducing the rate of fluid flow, thus creating an even flow of fluid along the edge also at high or higher rates of fluid flow than a nominal flow rate.

At least one advantage of the present disclosure is that the foaming or generation of foam is further mitigated or reduced by ensuring gentle introduction of the fluid, received from the inlet 250, into the receptacle 210. Yet an advantage of the present disclosure is that the flow of the fluid is kept more constant by providing a funnel shaped nozzle 100 ensuring a more constant flow of the fluid.

Figure 3A:
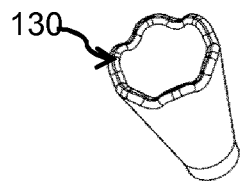
FIG. 3A-D shows edges comprising control elements having various forms according to embodiments of the present disclosure.

FIG. 3A shows an edge comprising a control element 130 having a sine shape according to embodiments of the present disclosure.

At least one advantage of the present disclosure is that the foaming may further be reduced by introducing a control element 130 having a sine shape, as shown in FIG. 3A.

Figure 3B:
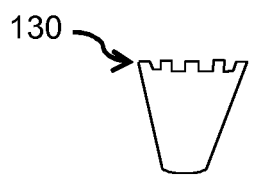

FIG. 3B shows an edge comprising a control element 130 having a square shape according to embodiments of the present disclosure.

At least one advantage of the present disclosure is that the foaming may further be reduced by introducing a control element 130 having a square shape, as shown in FIG. 3B.

Figure 3C:
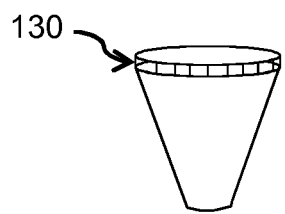

FIG. 3C shows an edge 130 having an edge with a plurality of slits according to embodiments of the present disclosure.

At least one advantage of the present disclosure is that the foaming may further be reduced by introducing a control element 130 with a plurality of slits, as shown in FIG. 3C.

Figure 3D:
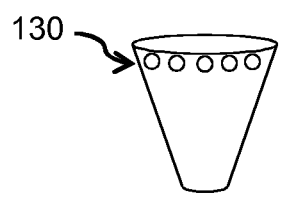

FIG. 3D shows an edge comprising a control element 130 having a plurality of holes, according to embodiments of the present disclosure.

At least one advantage of the present disclosure is that the foaming may further be reduced by introducing a control element 130 having a plurality of holes, as shown in FIG. 3D.

In situations when the edge of the output opening 120 is located above a current fluid level in the receptacle 210 of the air trapping device 200, foam may be generated or air may be introduced into the fluid, e.g. when fluid leaving the edge comprising a control element 130 of the nozzle 100 hit the surface of the fluid in the receptacle 210. In particular, when the fluid comprises protein molecules in the fluid, e.g. when the fluid is beer. At least one advantage of the present disclosure is that the generation of foam is mitigated or reduced by ensuring gentle introduction of the fluid, received from the inlet 250, into the receptacle 210. Yet an advantage of the present disclosure is that the flow of the fluid is kept more constant by providing a funnel shaped nozzle 100 ensuring a more constant flow of the fluid. Yet an advantage of the present disclosure is that foaming is further reduced by mitigating or reducing pulsation or variation in the fluid flow by introducing a control element 130. This is achieved by introducing an edge comprising the control element 130 that will break up the surface tension and thereby mitigate the formation of droplets causing pulsation in the fluid flow. The foaming may further be reduced by introducing a control element 130 having a sine shape, as shown in FIG. 3A. Yet an advantage of the present disclosure is that foaming is further reduced by forcing the foam towards the current surface of the fluid in the receptacle 210. This is achieved by locating the nozzle 100 top part, e.g. in an upper half or top quarter, of the tubular section.

These advantages are achieved by the air trapping device 200 and nozzle 100 according to one or more embodiments of the present disclosure.

The nozzle 100 may further comprise a guiding element 140 coupled to the body of the nozzle 100 and configured to guide the fluid distributed along the edge of the output opening in a direction of gravity. The guiding element 140 gently guides the fluid distributed along the edge 130 of the output opening 120 in a direction of gravity, thus avoiding foaming or injection of air into the fluid.

At least one further advantage of the present disclosure is that the generation of foam is further mitigated or reduced by ensuring gentle introduction of the fluid, received from the inlet 250, into the receptacle 210 by introducing a guiding element 140.

Figure 4:
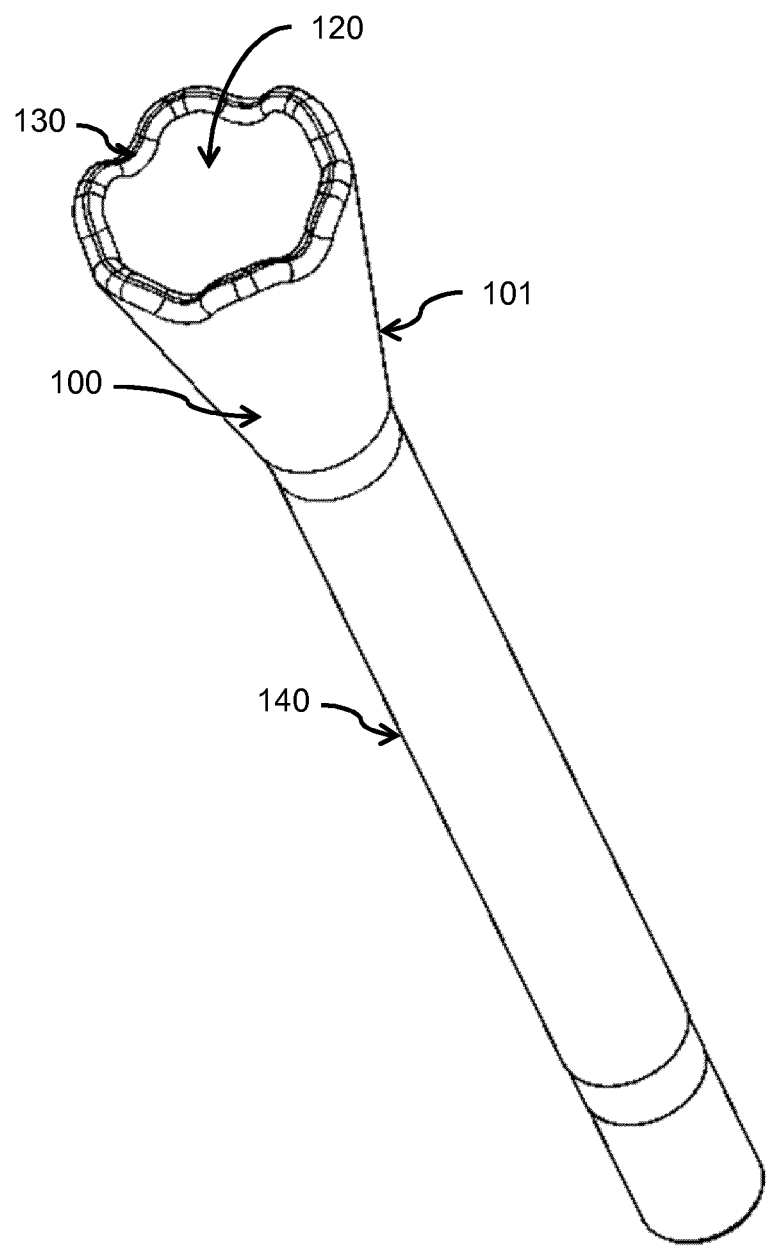
FIG. 4 shows a nozzle for an air trapping device having a guiding element according to one or more embodiments of the present disclosure.

FIG. 4 shows a nozzle for an air trapping device having a guiding element according to one or more embodiments of the present disclosure. The guiding element 140 may be coupled to the body of the nozzle 100 by enclosing an exterior wall 101 of the body of the nozzle 100 somewhere between the input opening 110 and the output opening 120. In other words, coupled somewhere along the exterior wall 101 of the body of the nozzle 100 below the edge 130 in the direction of gravity.

In one example the nozzle 100 is funnel shaped and having an exterior wall 101 which is connecting the input opening 110 and the output opening 120. The guiding element 140 may then be shaped as a tube and oriented with its longitudinal axis in the direction of gravity, whereby one open end of the tube enclose the exterior wall of the body of the nozzle somewhere between the input opening 110 and the output opening 120. The guiding element 140 may be coupled to the nozzle 100 e.g. by molding the nozzle 100 and guiding element 140 as one unit, by welding the nozzle 100 and guiding element 140 together or by gluing the nozzle 100 and guiding element 140 together.

In one embodiment of the present disclosure, the guiding element 140 has a dual functionality. The first functionality is, as described above, to guide the fluid distributed along the edge of the output opening in a direction of gravity and the second functionality is to provide fluid to the nozzle from the fluid inlet of the receptacle 210 of the air trapping device 200. In other words, fluid is guided to the control element 130 within an interior wall of the nozzle and fluid is from the edge by the exterior wall 101.

In one or more embodiments of the present disclosure, the guiding element 140 comprises a tubular element coupled in a fluid tight manner to the input opening 110 of the body of the nozzle 100 and is further couplable to a fluid inlet 250 of the air trapping device 200. The guiding element 140 may be coupled to the body of the nozzle 100 e.g. by molding the nozzle 100 and guiding element 140 as one unit, by welding the nozzle 100 and guiding element 140 together or by gluing the nozzle 100 and guiding element 140 together. The guiding element 140 may be configured to be oriented with its longitudinal axis in the direction of gravity or aligned and centered with a longitudinal axis of the nozzle 100.

In some situations, it may be beneficiary to provide fluid to the nozzle 100 from a direction other than from the direction of gravity. An embodiment achieving this is further described below.

Figure 5:
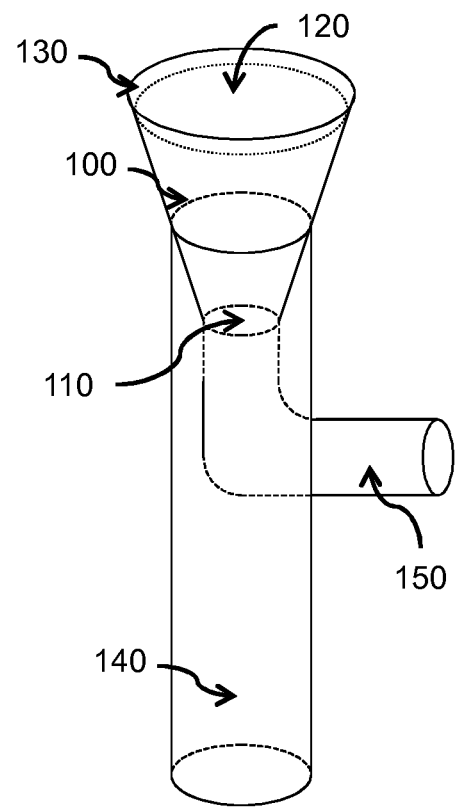
FIG. 5 shows a nozzle for an air trapping device having a guiding element and a feeder element according to one or more embodiments of the present disclosure.

FIG. 5 shows a nozzle 100 for an air trapping device 200 having a guiding element 140 and a feeder element 150 according to one or more embodiments of the present disclosure. The nozzle 100 further comprises a feeder element 150. The feeder element 150 is configured to provide fluid to the nozzle 100 from the fluid inlet 250 of the receptacle 210 of the air trapping device 200. The feeder element 150 comprises a tubular element coupled to the input opening 110 of the body and is further couplable to a fluid inlet 250 of the air trapping device 200.

Figure 6B:
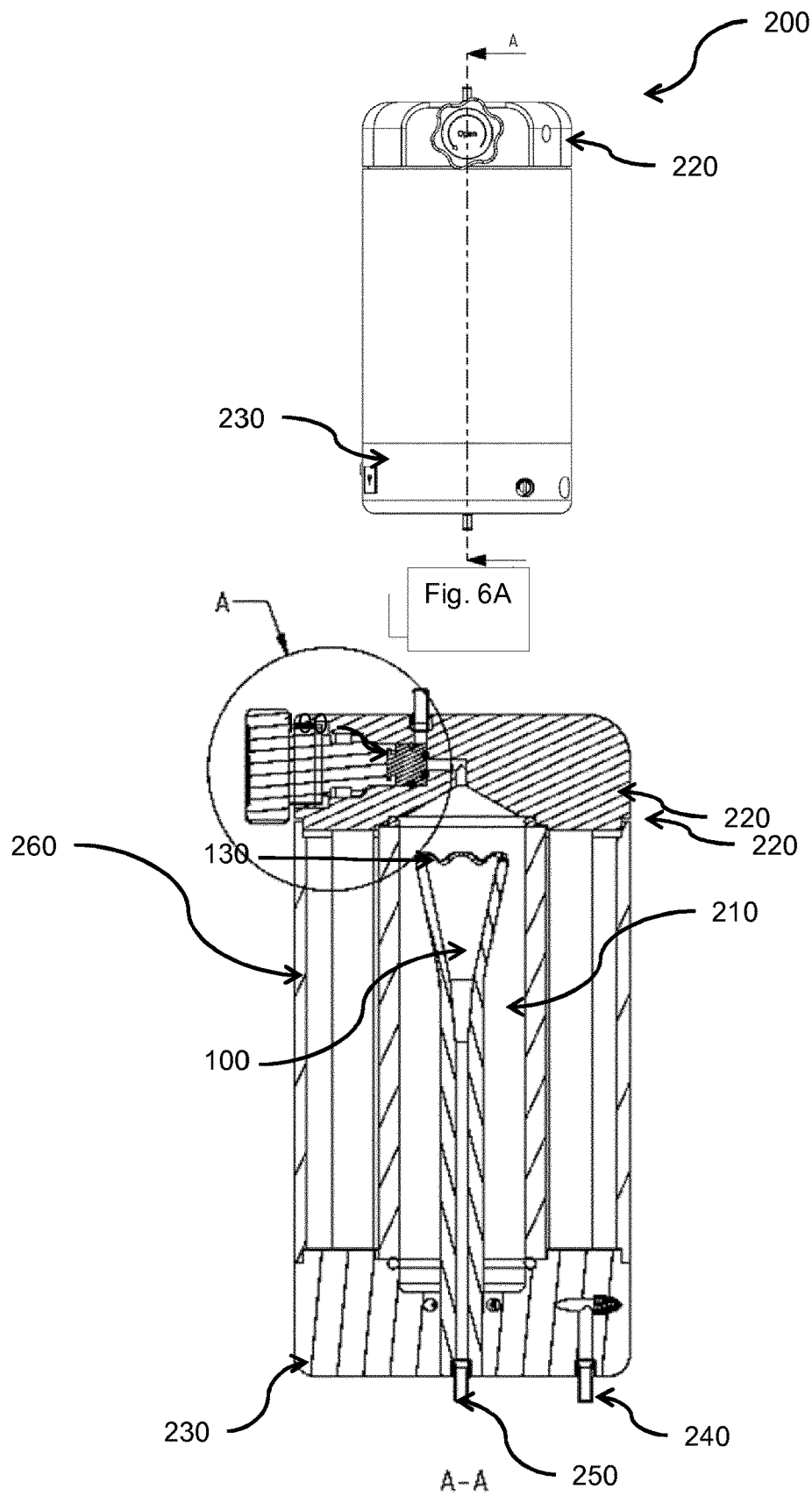

FIG. 6A-B shows an air trapping device 200 according to one or more embodiments of the present disclosure. FIG. 6A shows a drawing the air trapping device 200 and FIG. 6B shows a section drawing of the air trapping device 200.

The air trapping device 200 is configured to remove air from the fluid. The device comprises:

a receptacle 210 configured to hold the fluid, a nozzle 100 according to any of the embodiments described herein comprised in the receptacle 210.

The receptacle 210 comprises a lid section 220, a drainage section 230 comprising an outlet 240 and an inlet 250. The outlet 240 is configured to provide fluid from the receptacle 210 to an external receiving unit, e.g. a chromatography apparatus. The inlet 250 is configured to provide fluid to the receptacle 210, e.g. from an external source such as a fluid reservoir.

The air trapping device 200 further comprises a tubular section 260 interconnecting the lid section 220 with the drainage section 230, i.e. to form a sealed and fluid tight receptacle 210. In one example, this may be a tube made of glass or any other suitable material.

An important principle of the present disclosure is that fluid entering the receptacle 210 via the inlet 250 will require substantially the same time to pass through the air trapping device 200 to the outlet 240 regardless of the density of the fluid assuming a constant fluid flow rate through the inlet 250. This ensures a close match to a desired fluid gradient, e.g. a linear behavior when the fluid changes as a gradient over time from a fluid having low density to a fluid having a high density. This is achieved by the air trapping device 200 by providing fluid at the top of the receptacle 210 via the nozzle 100 and extracting fluid at the bottom of the receptacle 210 at the drainage section 230.

Another important principle is to allow air still imbedded in the fluid, after leaving the control element 130, time to reverse its direction of travel from the top to the bottom, due to buoyancy of the air in the fluid, and return to the surface of the fluid, thus further reducing the amount of air in the fluid. This is achieved by providing a tubular section 260 which have a relatively large cross section in relation to a cross section of the nozzle 100. This will ensure a relatively low fluid flow rate from the edge 130 to the outlet 240 in relation to the fluid flow rate from the inlet 250 to the edge 130, thus further reducing the amount of air in the fluid.

In one or more embodiments, the nozzle 100 comprises a guiding element 140 having a cross section which have an area less than or equal to 1/10 of an area of a cross section of the tubular section 260. In one or more embodiments, the nozzle 100 comprises a guiding element 140 having a cross section which have an area less than or equal to 1/4 of an area of a cross section of the tubular section 260.

At least one advantage of the present disclosure is that further air is removed from the fluid by increasing the time for air, imbedded or trapped in the fluid, to reverse its direction of travel from the top to the bottom, due to buoyancy of the air in the fluid, and return to the surface of the fluid. This is ensured by allowing a low rate of fluid flow in the receptacle 210 compared to the rate of fluid flow in the inlet 250. In other words, the larger the cross section of the tubular section 260 is in relation to the cross section of the guiding element 140, the lower the rate of fluid direction of travel from the top to the bottom will be. The low rate of fluid flow is achieved by a guiding element 140 having a cross section which have an area less than or equal to ⅒ or ¼ of an area of a cross section of the tubular section 260.

In one example, the guiding element 140 has a diameter of 10 mm and the tubular section 260 has a diameter of 41 mm. The guiding element 140 then has a cross section with an area of 10 mm ^2*π=314 and the cross section of the tubular section 260 then has an area of equal to 20.5 mm ^2*π≈1320. The guiding element 140 then has a cross section with an area ≈¼ of the cross section of the tubular section 260.

In some situations, when the fluid travels from the control element 130 to the outlet 240, some areas of the drainage section 230 will form dead zones or stagnant zones where fluid remain stationary. This problem is addressed by the embodiments in FIG. 7 and FIG. 8 further described below.

Figure 7:
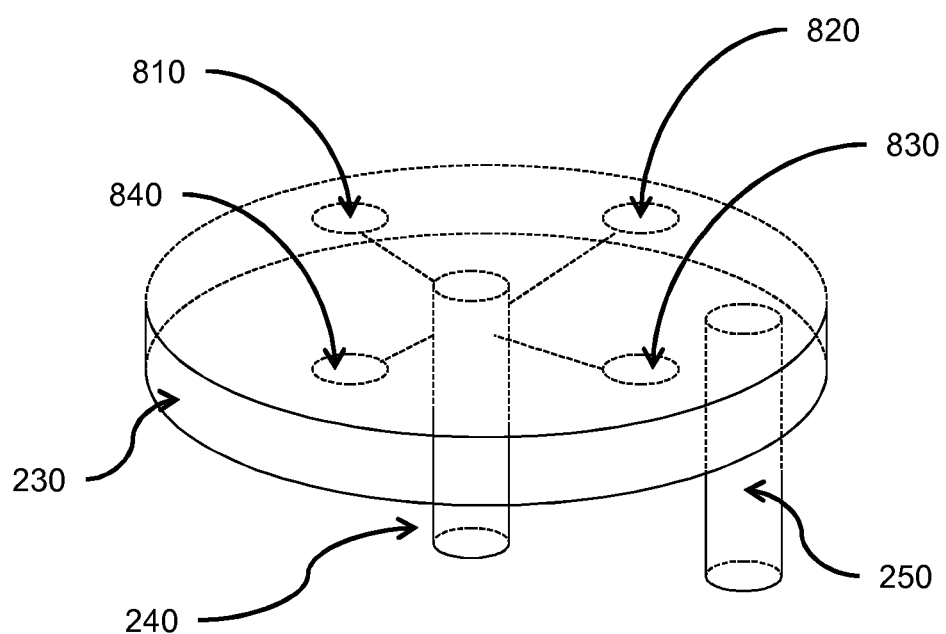
FIG. 7 shows an air trapping device having a drainage section that comprises a plurality of openings according to one or more embodiments of the present disclosure.

FIG. 7 shows an air trapping device having a drainage section that comprises a plurality of openings according to one or more embodiments of the present disclosure. The drainage section 230 of the air trapping device 200 comprises a plurality of openings 810-840 facing the tubular section. Each opening is then coupled or connected to the fluid outlet 240, e.g. by fluid channel elements. The plurality of openings may comprise 2-10 openings or any other suitable number of openings. This embodiment reduces the formation of dead zones or stagnant zones by extracting fluid in multiple locations.

Figure 8:
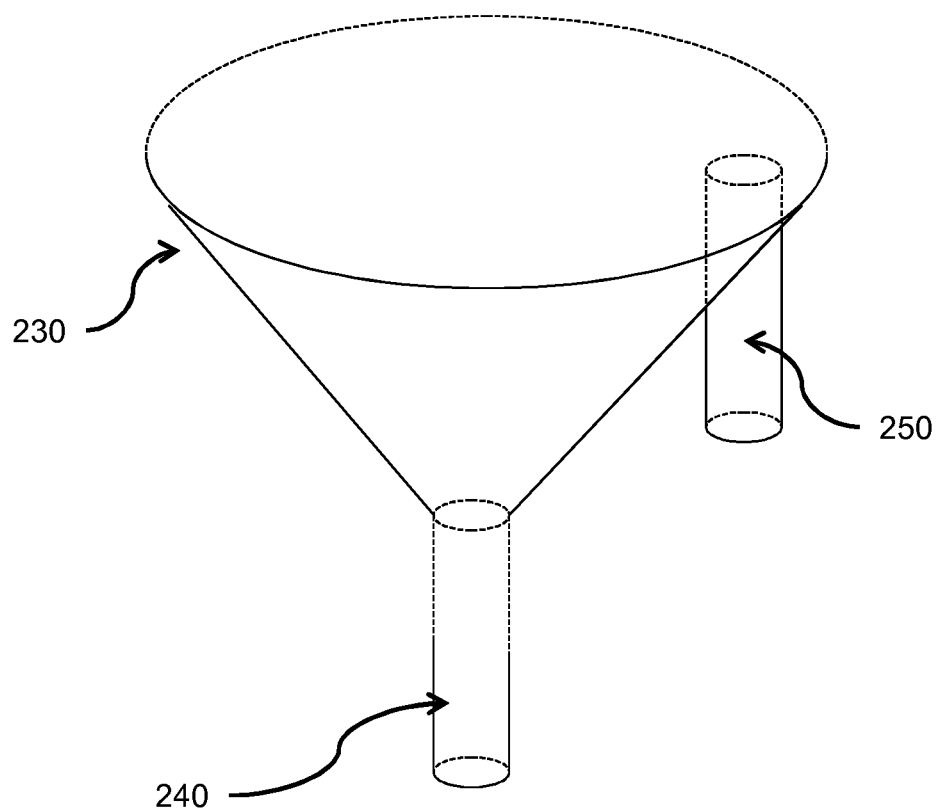
FIG. 8 shows an air trapping device having a drainage section having a funnel shape according to one or more embodiments of the present disclosure.

FIG. 8 shows an air trapping device 200 having a drainage section having a funnel shape according to one or more embodiments of the present disclosure. The drainage section 230 of the air trapping device 200 is configured as having a funnel shape and having an opening facing the tubular section and being coupled to the fluid outlet 240. The opening facing the tubular section may have a cross section equal to the cross section of the tubular section 260.

As mentioned above, it is desirable to have a relatively low fluid flow rate from the edge 130 to the outlet 240 in relation to the fluid flow rate from the inlet 250 to the edge 130. This is achieved by the embodiment below by further increasing the cross section of the tubular section 260 by an annular bulge 1010.

Figure 9:
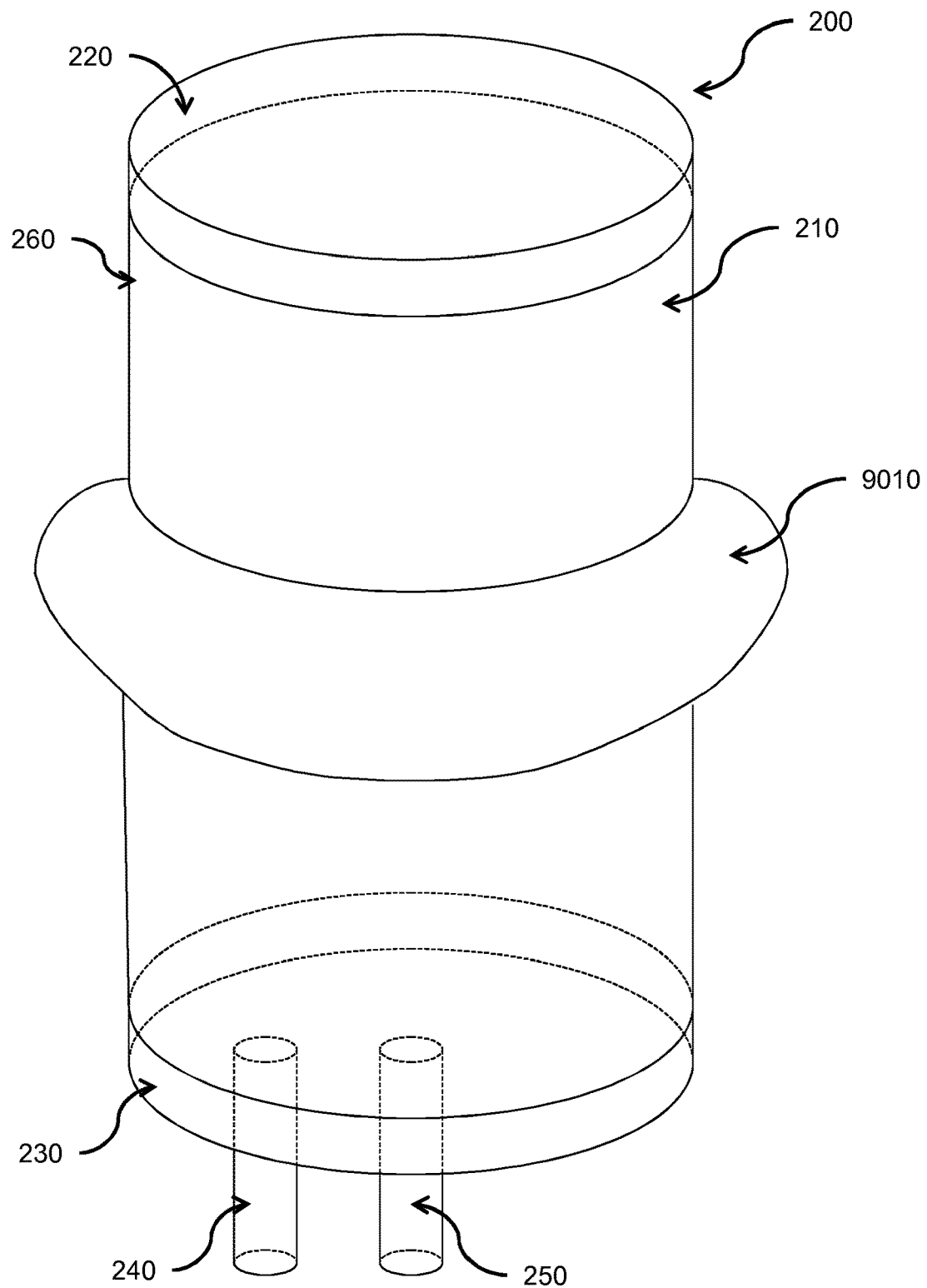
FIG. 9 shows an air trapping device having a tubular section with an annular bulge according to one or more embodiments of the present disclosure.

FIG. 9 shows an air trapping device having a tubular section 260 with an annular bulge 9010 according to one or more embodiments of the present disclosure. The tubular section 260 may further comprise an annular bulge 9010. This will ensure a relatively low fluid flow rate from the control element 130 to the outlet 240 in relation to the fluid flow rate from the inlet 250 to the edge 130, thus further reducing the amount of air in the fluid.

As the fluid generally has a higher density than air, the fluid will seek to flow downwards in the direction of gravity. On the other hand air trapped in the fluid and having a lower density than the fluid, will seek to flow or travel in a direction opposite to the direction of gravity. The air trapping device 200 is therefore adapted to be used with its longitudinal axis aligned with the direction of gravity such that the drainage section 230 is oriented in the direction of gravity and the lid section 220 is oriented in a direction opposite to the direction of gravity.

In one or more embodiments, the device is configured to be operated when oriented with the lid section 220 in a direction opposite to the direction of gravity. In one or more embodiments, the device is configured to be operated when oriented with the lid section 220 in a direction opposite to the direction of gravity and the drainage section 230 is oriented in the direction of gravity.

As described further above, air trapping device 200 is configured to allow fluid to flow from the control element 130 of the nozzle 100 to the outlet 240. It is desirable that the control element 130 is located above the surface of the fluid in the receptacle 210 to allow air still imbedded in the fluid, after leaving the control element 130, time to reverse its direction of travel from the top to the bottom, due to buoyancy of the air in the fluid, and return to the surface of the fluid.

In one or more embodiments, the air trapping device 200 is provided with the output opening 120, or the control element 130, of the nozzle located in an upper or top section of the tubular section 260. In one or more embodiments, the air trapping device 200 is provided with the output opening 120, or the control element 130, of the nozzle located in an upper half of the tubular section 260. In one or more embodiments, the air trapping device 200 is provided with the output opening 120, or the control element 130, of the nozzle located in a top quarter of the tubular section 260. In one or more embodiments, the air trapping device 200 is provided with the output opening 120, or the control element 130, of the nozzle 100 located in an upper ⅒ section of the tubular section 260, i.e. the output opening 120, or the control element 130, of the nozzle is located in the upper 10% of the total height of the tubular section 260.

At least one advantage of this embodiment is that foaming is further reduced by forcing the foam towards the current surface of the fluid in the receptacle 210. This is achieved by locating the nozzle 100 top part, e.g. in an upper half or top quarter, of the tubular section. Yet an advantage is that the time for air imbedded or trapped in the fluid to reverse its direction of travel from the top to the bottom is increased, due to buoyancy of the air in the fluid, and return to the surface of the fluid.

Figure 10:
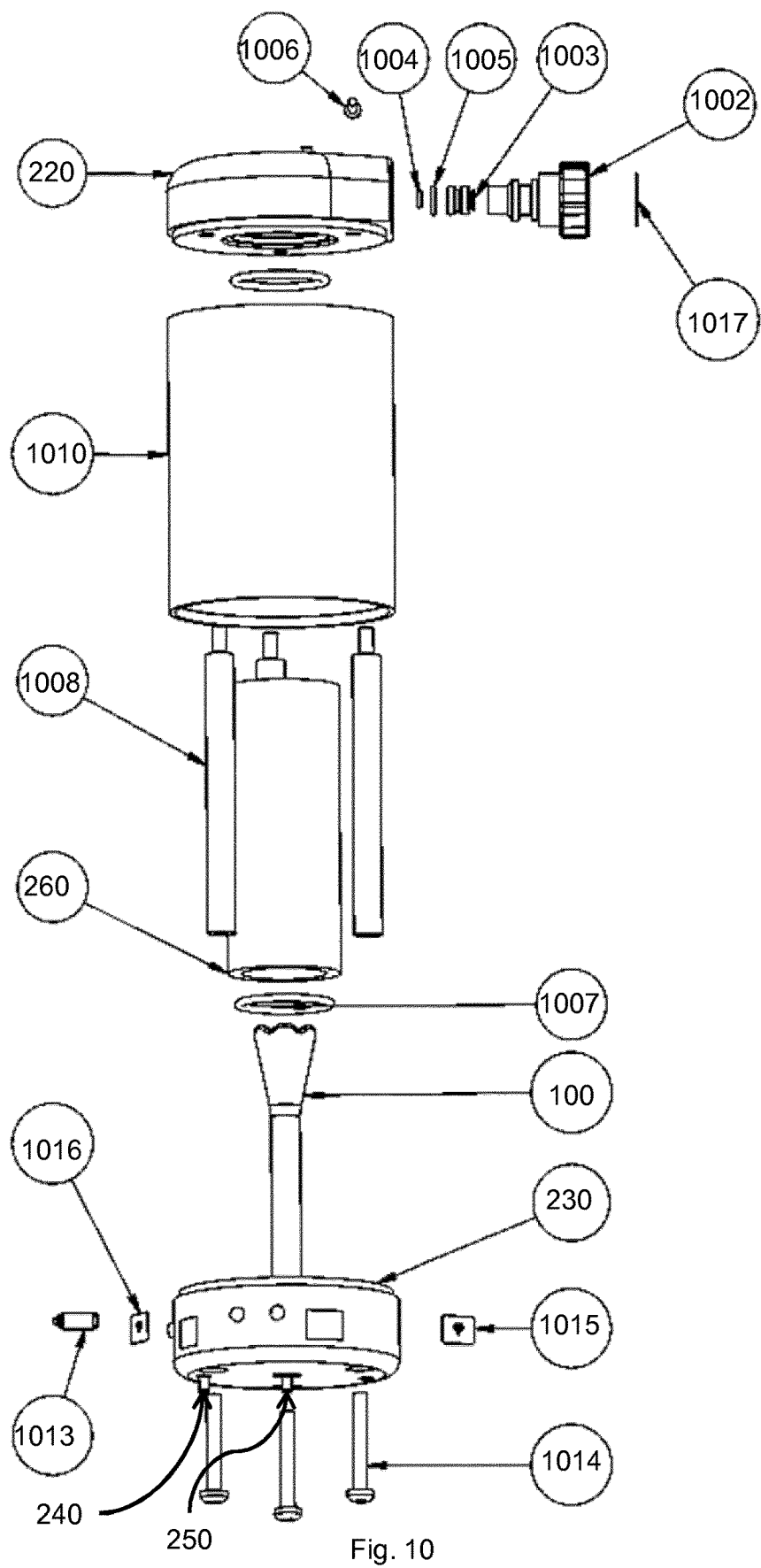
FIG. 10 shows an exploded view of an example of the air trapping device according to one or more embodiments of the present disclosure.

FIG. 10 shows an exploded view of an example of the air trapping device 200 according to one or more embodiments of the present disclosure. The exploded view shows the same features as the feature shown in FIGS. 1, 4 and 6:

I.e. a nozzle 100, a lid section 220, a drainage section 230 and a tubular section 260, e.g. a glass tube.

In addition, the air trapping device 200 comprises:

a connector 1002, an air valve plunge 1003, O-rings 1004-1005, a locking screw 1006 and an O-ring 1007, configured to seal the coupling between the tubular section 260 and the drainage section 230. The air trapping device 200 further comprises a distance screw 1008, configured to couple the lid 220. The air trapping device 200 further comprises a drainage section 230, a protective cover 1010 configured to protect the tubular section 260. The air trapping device 200 further comprises a plug 1013 configured to fill a bore. The air trapping device 200 further comprises a mounting screw 1014, e.g. head Screw ISO 14583 M5x35 A4-70. The air trapping device 200 further comprises labels 1015-1016 indicative of the inlet 250 and the outlet 240.

Figure 11:
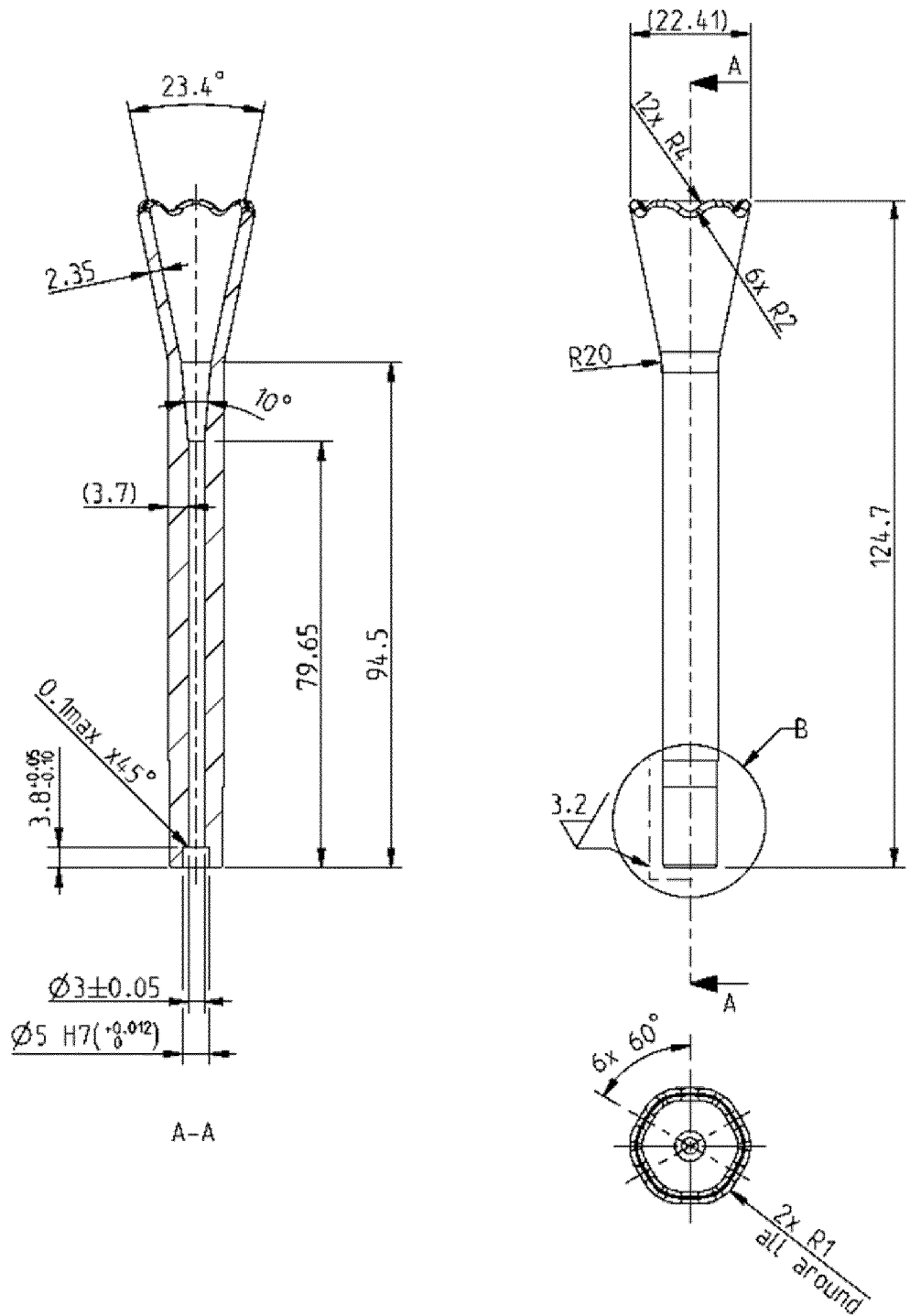
FIG. 11 shows an example of the nozzle according to one or more embodiments of the present disclosure.

FIG. 11 shows an example of the nozzle according to one or more embodiments of the present disclosure. An exemplary embodiment of the nozzle is shown in FIG. 11. The funnel shape of the nozzle has an opening angle of 23.4 degrees, as can be seen in the section A-A of FIG. 11. The control element may comprise 6 sections, each comprising at least one full a sine shape or period. Each section may correspond to 60 degrees of the control element 130. As can be seen from FIG. 11, the control element may comprise six "valley" sub-sections having a radius of 2 mm and 12 "ridge" sections having a radius of 4 mm.

Finally, it should be understood that the invention is not limited to the embodiments described above, but also relates to and incorporates all embodiments within the scope of the appended independent claims.

The invention claimed is:

1. An air trapping device configured to remove air from a fluid, the air trapping device comprising:
   a receptacle configured to hold the fluid, the receptacle comprising:
      a nozzle, the nozzle comprising body having an input opening configured to receive the fluid and an output opening configured to distribute the fluid along an edge of the output opening, wherein the edge comprises a control element configured to reduce surface tension of the fluid,
      a lid section,
      a drainage section comprising a fluid outlet and a fluid inlet, and
      a tubular section interconnecting the lid section with the drainage section;
   a feeder element comprising a tubular element coupled to the input opening of the body of the nozzle and being further coupled to a fluid inlet of the air trapping device; and
   a guiding element coupled to the body of the nozzle and configured to guide the fluid distributed along the edge of the output opening in a direction of gravity along a surface of the guiding element,
   wherein the output opening of the nozzle is located in a top quarter of the tubular section,
   wherein the body of the nozzle has a funnel shape and an input opening being smaller than the output opening,
   wherein the control element is formed as one of a sine shape, a square shape, an edge with slits or an edge with a plurality of holes, and
   wherein the guiding element comprises a tubular element coupled to the input opening of the body of the nozzle.

2. The device according to claim 1, wherein the nozzle comprises a guiding element having a cross section which have an area less than $1/10$ of an area of a cross section of the tubular section.

3. The device according to claim 1, wherein the drainage section comprises a plurality of openings facing the tubular section, each opening being coupled to the fluid outlet.

4. The device according to claim 1, wherein the drainage section is configured as having a funnel shape and having an opening facing the tubular section and being coupled to the fluid outlet.

5. The device according to claim 1, wherein the tubular section comprises an annular bulge.

6. The device according to claim 1, wherein the device is configured to be operated when oriented with the lid section in a direction opposite to the direction of gravity.

* * * * *